(12) United States Patent
Klicpera

(10) Patent No.: US 9,266,136 B2
(45) Date of Patent: Feb. 23, 2016

(54) APPARATUS FOR DISPLAYING, MONITORING AND/OR CONTROLLING SHOWER, BATH OR SINK FAUCET WATER PARAMETERS WITH AN AUDIO OR VERBAL ANNUNCIATIONS OR CONTROL MEANS

(76) Inventor: Michael Klicpera, La Jolla, CA (US)

( * ) Notice: Subject to any disclaimer, the term of this patent is extended or adjusted under 35 U.S.C. 154(b) by 1017 days.

(21) Appl. No.: 12/877,094

(22) Filed: Sep. 7, 2010

(65) Prior Publication Data
US 2011/0031331 A1 Feb. 10, 2011

Related U.S. Application Data

(63) Continuation-in-part of application No. 11/877,860, filed on Oct. 24, 2007, and a continuation-in-part of application No. 12/539,150, filed on Aug. 11, 2009.

(60) Provisional application No. 61/241,111, filed on Sep. 10, 2009.

(51) Int. Cl.
| | |
|---|---|
| *E03C 1/06* | (2006.01) |
| *B05B 12/02* | (2006.01) |
| *B05B 12/00* | (2006.01) |
| *B05B 12/12* | (2006.01) |
| *E03B 7/04* | (2006.01) |
| *E03C 1/04* | (2006.01) |

(Continued)

(52) U.S. Cl.
CPC .............. *B05B 12/02* (2013.01); *B05B 12/004* (2013.01); *B05B 12/008* (2013.01); *B05B 12/12* (2013.01); *E03B 7/04* (2013.01); *E03C 1/0408* (2013.01); *G01F 15/024* (2013.01); *G01F 15/063* (2013.01); *G01F 15/075* (2013.01); *G01F 15/0755* (2013.01); *G01K 13/02* (2013.01); *G10L 15/22* (2013.01); *B05B 1/18* (2013.01); *E03C 2001/0418* (2013.01); *G01K 2013/026* (2013.01); *G01K 2207/00* (2013.01); *G10L 2015/223* (2013.01); *Y10T 137/8158* (2015.04)

(58) Field of Classification Search
USPC ...................................................... 4/618, 660
See application file for complete search history.

(56) References Cited

U.S. PATENT DOCUMENTS

| | | | | |
|---|---|---|---|---|
| 4,936,508 A | * | 6/1990 | Ingalz .............................. | 239/72 |
| 6,016,836 A | * | 1/2000 | Brunkhardt .............. | 137/624.11 |

(Continued)

FOREIGN PATENT DOCUMENTS

WO WO 2006073318 A1 * 7/2006

OTHER PUBLICATIONS

WO 2006073318.*

(Continued)

*Primary Examiner* — Lauren Crane
(74) *Attorney, Agent, or Firm* — Michael Klicpera

(57) ABSTRACT

The present invention is a display apparatus for affixation to shower head, bath or sink faucet water supply piping or incorporated within a shower, or bath or faucet head. The display apparatus includes a power generation, CPU or microprocessor, temperature sensor and/or water flow sensors, timing circuits, and audio or verbal communication means and a display means. The present invention can position some components remotely from other components that communicate by wired or wireless means. The communication means is designed 1) to detect and respond to audio signals or verbal instructions or commands and/or 2) annunciate audio signals or verbal messages.

28 Claims, 5 Drawing Sheets

(51) Int. Cl.
*G01F 15/02* (2006.01)
*G01F 15/06* (2006.01)
*G01F 15/075* (2006.01)
*G01K 13/02* (2006.01)
*G10L 15/22* (2006.01)
*B05B 1/18* (2006.01)

(56) References Cited

U.S. PATENT DOCUMENTS

| | | | |
|---|---|---|---|
| 7,035,091 B2* | 4/2006 | Le et al. | 361/679.03 |
| 2003/0233885 A1* | 12/2003 | Bird et al. | 73/861 |
| 2006/0200364 A1* | 9/2006 | Riggs | 705/1 |
| 2007/0061851 A1* | 3/2007 | Deshpande et al. | 725/88 |
| 2008/0083893 A1* | 4/2008 | Rubenstein | 251/129.04 |

OTHER PUBLICATIONS http://en.wikipedia.org/wiki/Flow_measurement.
http://en.wikipedia.org/wiki/List_of_temperature_sensors.
http://en.wikipedia.org/wiki/Thermocouple.
http://en.wikipedia.org/wiki/List_of_speech_recognition_software.
http://en.wikipedia.org/wiki/Wireless.

* cited by examiner

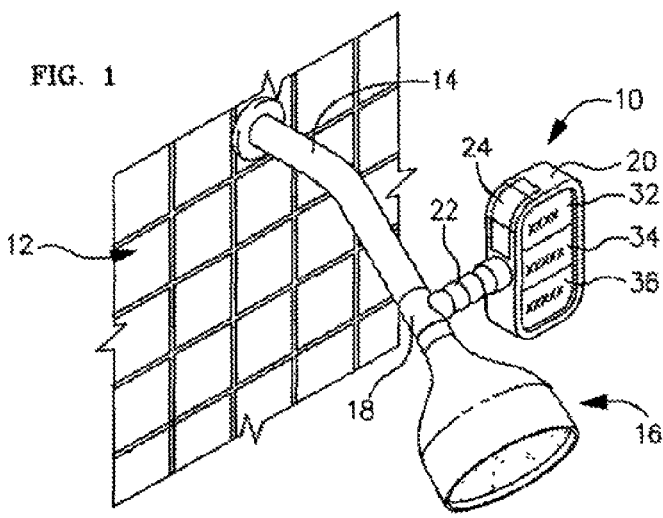
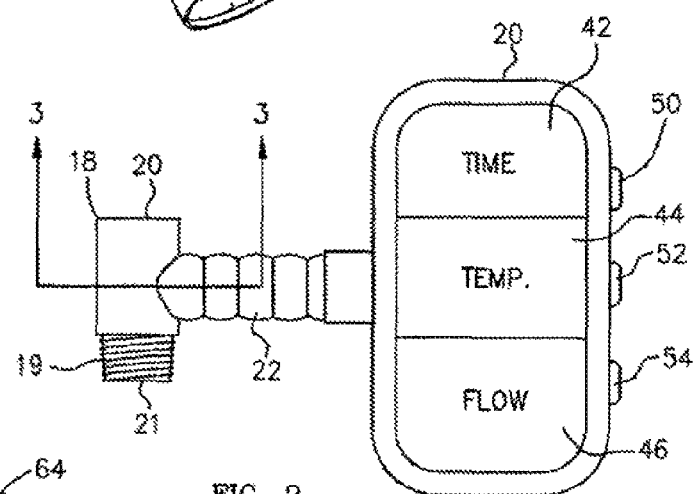
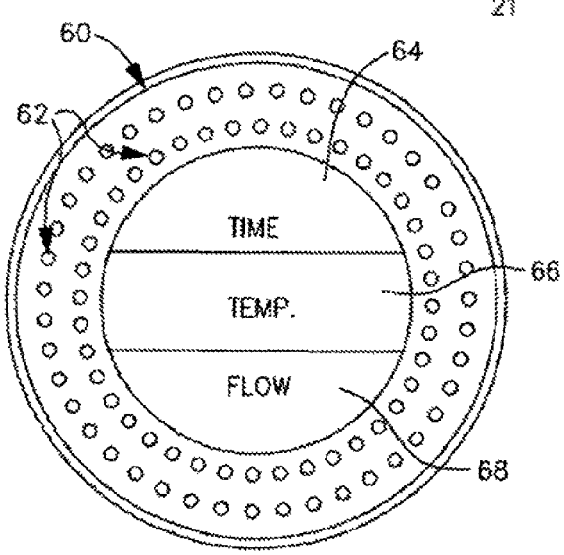
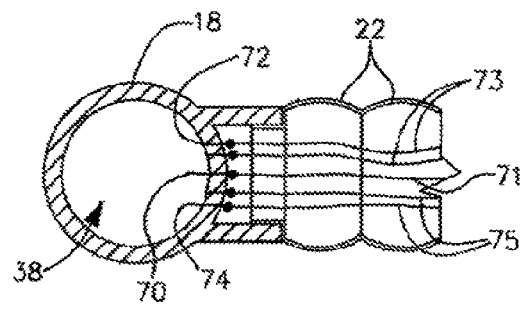

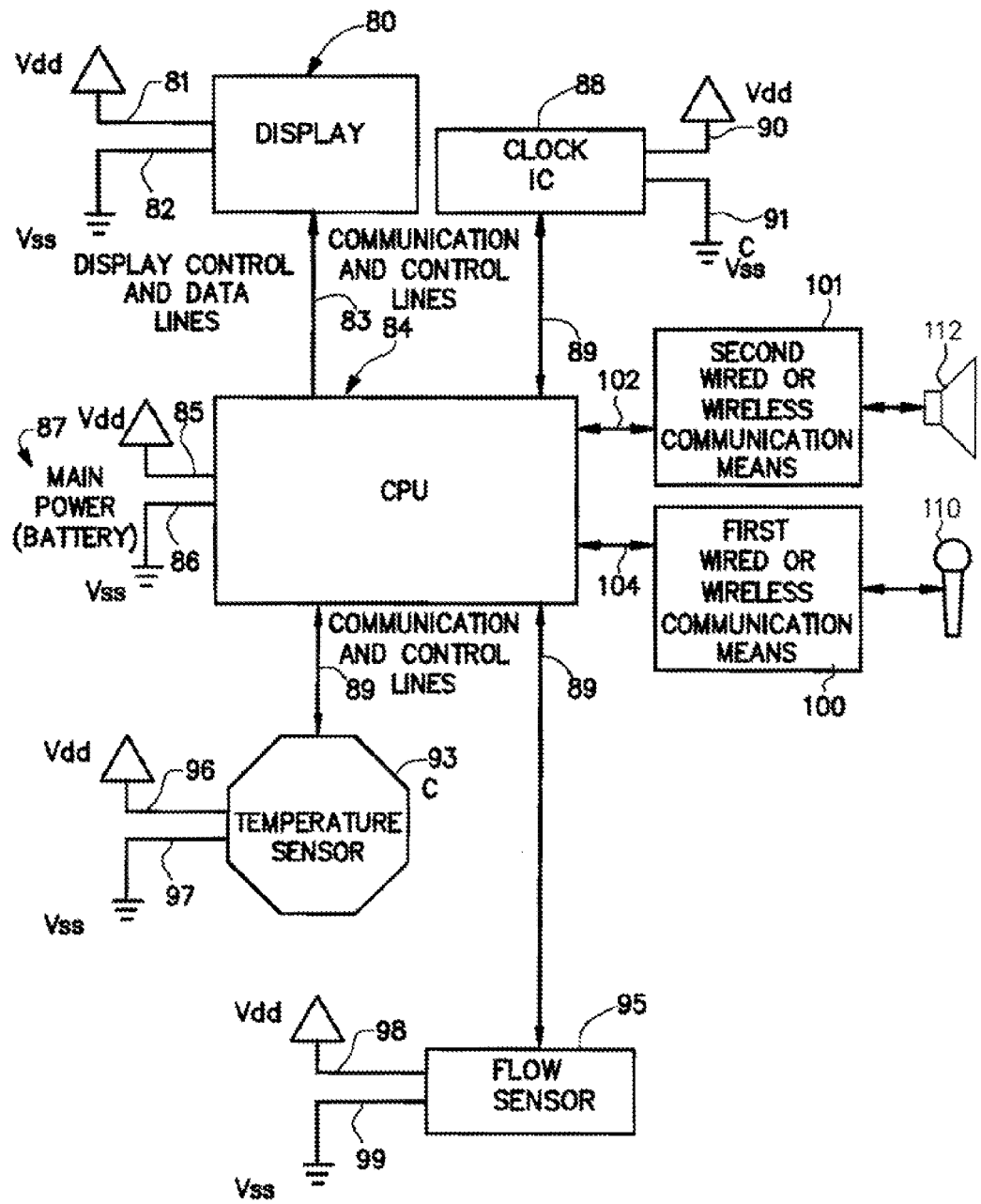

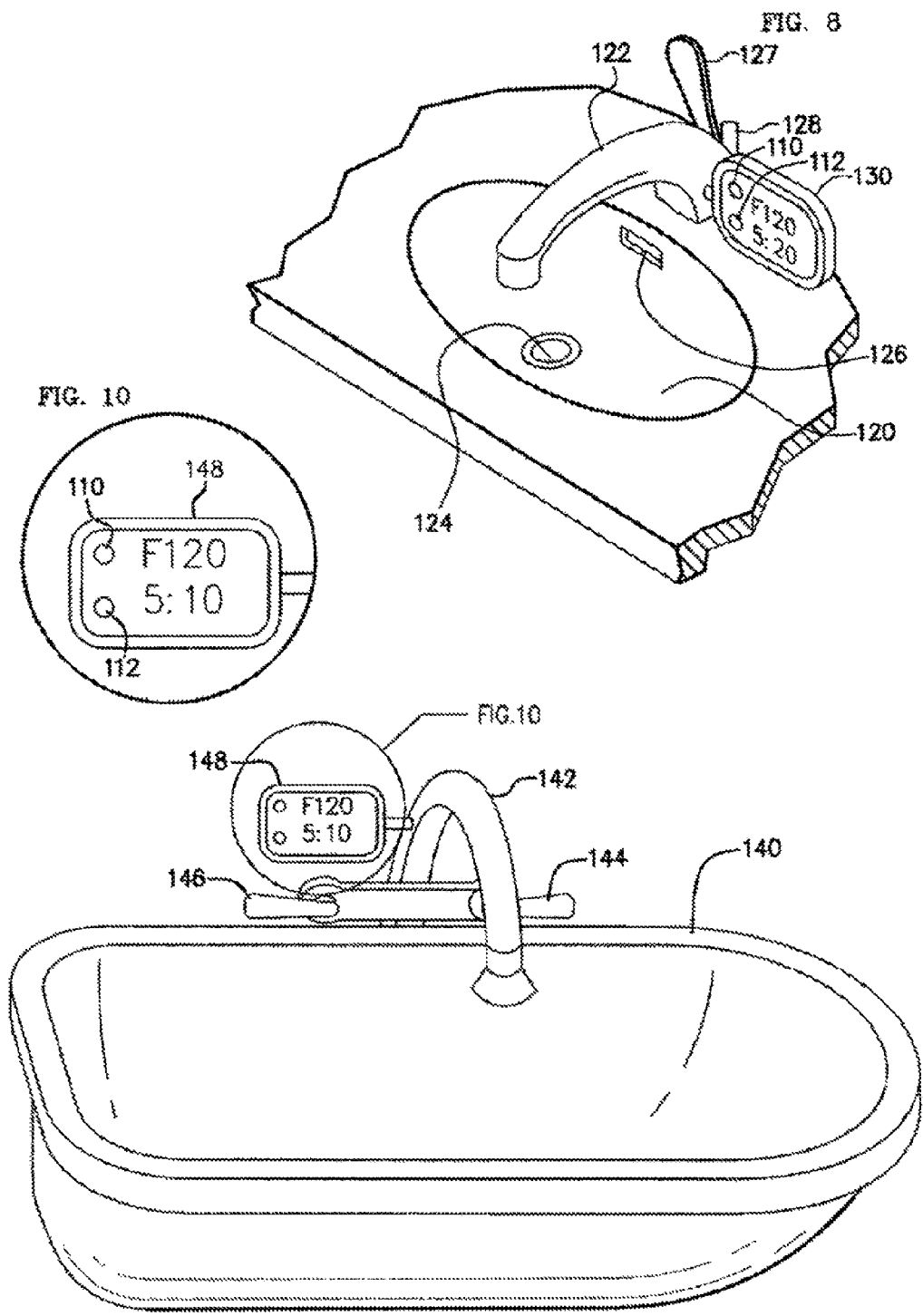

APPARATUS FOR DISPLAYING, MONITORING AND/OR CONTROLLING SHOWER, BATH OR SINK FAUCET WATER PARAMETERS WITH AN AUDIO OR VERBAL ANNUNCIATIONS OR CONTROL MEANS

RELATED APPLICATIONS

This application is a continuation-in-part of U.S. patent application Ser. No. 11/877,860 filed on Oct. 24, 2007 and U.S. patent application Ser. No. 12/539,150 filed on Aug. 11, 2009 and Provisional Application Ser. No. 61/241,111 filed on Sep. 10, 2009.

FIELD OF THE INVENTION

This apparatus and the method of use relates to shower or bath heads and water supply piping, more particularly, to shower head, faucet, bath or water supply piping having a visual analog or digital display of certain parameters of the supplied water, such as the temperature, flow rate, and time and timing parameters.

BACKGROUND OF THE INVENTION

Conventional shower head designs include those having a shower head housing with a plurality of passageways allowing various water sprays to flow from the shower head. Furthermore, shower heads having a surface with a plurality of passageways, or nozzle orifices which utilize a backing disk having a plurality of resilient and flexible nozzle tips protruding through the nozzle orifices are known. The resilient nozzles of these known shower heads allow for convenient elimination of the build-up of calcium or other deposits by manually flexing the resilient nozzles when it appears that material is collecting therein. In these known shower heads, the entire nozzle is formed of a resilient and flexible rubber which does not match the finish of, e.g., a brass or chrome shower head.

Conventional faucets include one or more water supply valves in communication with a generally tubular structure that extends from the base of a sink area and allows water to flow into a sink basin. The faucet is generally used to facilitate washing various objects with the assistance of a surfactant. Surfactants are compounds that lower the surface tension of a liquid allowing easier spreading or lowering the interfacial tension between a liquid and an object. The water supply can be operated by a single mixing valve or by two valves for regulated the amount of hot and cold water. Conventional bath faucets extend from the wall or base of an enclosure and allow water to flow into the bath enclosure.

The use of adjustable shower heads, sink and bath faucets are known in the prior art. More specifically, adjustable shower heads sink and bath faucets heretofore devised and utilized are known to consist basically of familiar, expected and obvious structural configurations, notwithstanding the myriad of designs encompassed by the crowded prior art which have been developed for the fulfillment of countless objectives and requirements.

Water conservation is becoming a major issue for many cities and a apparatus for monitoring water usage at a specific residential or corporate site could be useful in supporting water conservation.

Another type of an adjustable shower head, sink/bath faucet and water supply piping assemblies are conventionally constituted by a hose which may be in the form of a flexible tube protected by metal coils or in the form of a plastic hose optionally including braiding. In either case, the hose is generally linear in shape and has a length lying in the range 1.25 meters (m) to 2 m. When not in use, the hose hangs down into a bath tub or other bathroom fitting where it is often dirtied by contact with dirty water.

Sometimes the hose can be hidden away in a chute (requiring a hole to be made), in which case it dirties a volume that is inaccessible for cleaning. The hole often leads to water seeping under the bath tub. Furthermore, these drawbacks (difficulty of storage and problems with dirt) make it undesirable to install a longer hose, even though a longer hose would often be convenient when the shower head is in use. As a result of shower hoses not being long enough, they are often damaged by the user pulling on them.

Anti-scalding pressure balance and thermostatic temperature control valves are becoming an important part in bathroom plumbing because the attempt to minimize scalding and cold water shocks that can occur in a shower when a toilet is flushed or a faucet is turned on.

Furthermore, there is a need for monitoring water parameters for home and commercial use can be incorporated into the device using wireless technology.

Furthermore, there is a need for displaying, monitoring and/or controlling water parameters using audio or verbal annunciations or commands.

Accordingly, a need remains for an adjustable shower, sink or bath faucet or water supply piping with displays either with analog or digital means certain parameters, such as time on, flow rate, total volume, and temperature, in order to overcome or supplement the above-noted shortcomings. The present invention satisfies such a need by providing an adjustable shower head, bath or faucet assembly that is convenient and easy to use, provides adequate reach and adjusting capabilities for various applications, and is attractive in appearance.

In additional, this is a need for an adjustable shower or bath head or water supply piping monitors water usage to encourage water savings and promote careful conscientious use of water and energy resources.

SUMMARY OF THE INVENTION

The present invention is a display apparatus that is in communication with a shower sink or bath water supply piping or incorporated within a shower, bath or sink faucet, in an aesthetically pleasing format and comprised of fabrication materials e.g., a polymeric or metallic bases with chrome, brass white or colored finishes or combination of these finishes and materials of construction. The display apparatus includes a power generation, a microprocessor, temperature and/or water flow sensors, timing circuits and a display means. The display means can be an analog or digital display or combination of display means and can have touch screen capability or ergonomically placed buttons can be incorporated into the display means to change parameter units (e.g. metric to US), set alarm conditions (e.g. temperature over set point, time past a set point, volume (gallons) that passed a set point). The display means must be able to provide sufficient lighting in shower conditions. In addition, the display means must be able to sustain capability in moist wet conditions. In some embodiments defined attachment to a shower display apparatus, know piping joint technology will be used for installation into both new and presently installed shower systems. In the embodiment defined by the display means incorporate into the shower head the shower head/display assembly can also be installed in both new and presently installed shower systems. A speaker and microphone is electrically through wired or wireless means connected to the microprocessor and circuitry to allow for verbal or audio annunciations or verbal and audio commands. The display apparatus can include an wireless communication means such as BlueTooth technology or IEEE 802.11a, IEEE 802.11b, IEEE 802.11g, IEEE 802.11n, Zigbee radio-frequency modulation techniques and thus can communication with a remote speaker and/or microphone, or a remote display or recording apparatus. In one of the embodiments, the display apparatus will include audio or verbal annunciations of certain water parameters, such as announcing "temperature ninety nine degrees Fahrenheit". In another of the embodiment, the display apparatus can be incorporated to include a means to use audio commands to instruct the present invention to perform certain functions, such as turning on or turning off the water supply. In another embodiment, the means to use audio or verbal commands to instruct the present invention to perform certain functions with or without the use of a display means. Furthermore, in the embodiment using audio or verbal commands, a confirmatory annunciation may be incorporated to reduce the occurrence of false commands.

BRIEF DESCRIPTION OF THE DRAWINGS

FIG. 1 is a perspective view of the embodiment comprising the display apparatus attached to the shower head's water supply piping, an articulated joint mechanism, and including a shower head in accordance with the present invention.

FIG. 2 is a front view of a typical display means showing the articulated joint mechanism and selection buttons on the side of the display means body.

FIG. 3 is a cross-section taken from the 3-3 line on FIG. 2 showing the sensors and there relative position of the sensors in the supply line lumen and the connecting wires for the display means.

FIG. 4 is a perspective view of the second embodiment showing the display means incorporated within the shower head in accordance with the present invention.

FIG. 5 electrical schematics showing the main power, CPU or microprocessor, the analog or digital display means, the clock circuit, the temperature sensor, microphone and the flow sensor.

FIG. 8 is a perspective view of a third embodiment showing the display apparatus extending from a typical sink faucet.

FIG. 9 is a perspective view of a fourth embodiment showing the display apparatus extending from a typical bath faucet.

FIG. 10 is an exploded view of the third, fourth, fifth and sixth embodiments display apparatus showing a speaker and a microphone incorporated within the display apparatus.

Corresponding reference characters indicate corresponding parts throughout the several views. The exemplifications set out herein illustrate exemplary embodiments of the invention, and such exemplifications are not to be construed as limiting the scope of the invention in any manner.

DESCRIPTION OF THE PREFERRED EMBODIMENTS

Figure 6:
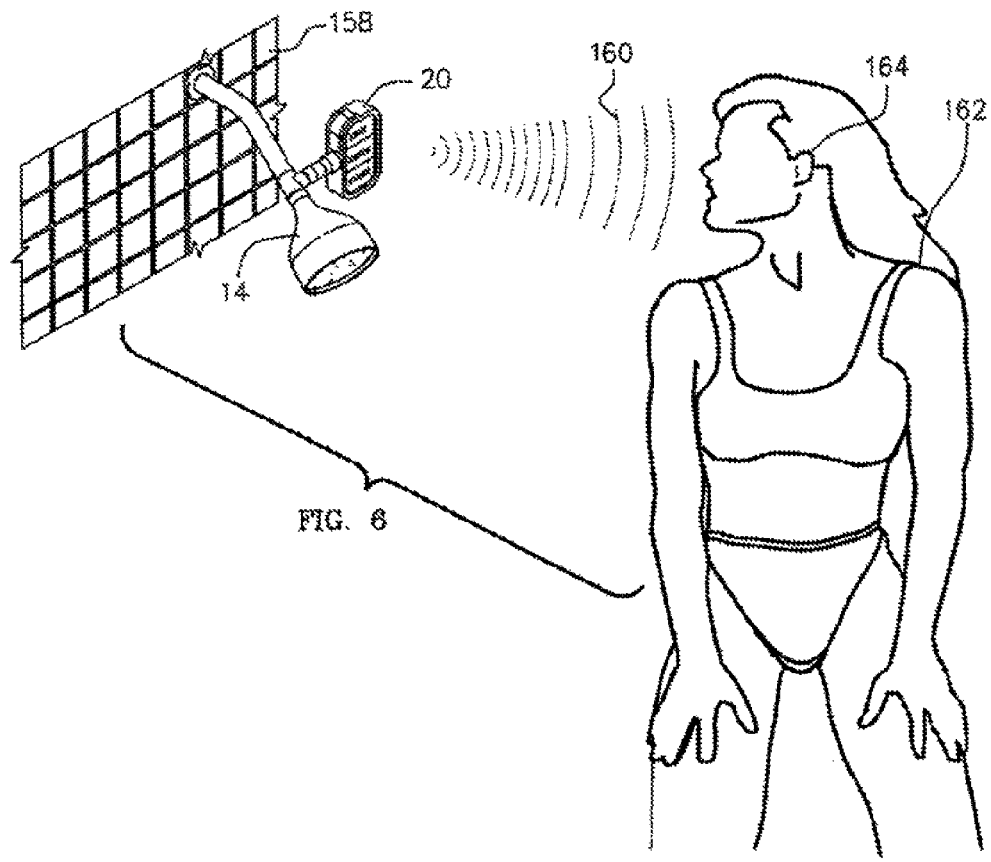
FIG. 6 is a perspective view showing the display apparatus installed in a shower enclosure communicating an audio or verbal message to an individual.

As defined wherein, the term "water parameters" refers to various situations or conditions, such as, but not limited to, temperature, water pressure, water flow rate, water flow time, and the capability of turning on and off a water supply. The term audio or verbal annunciations water parameter information or control confirmation that is provided in audio or verbal format that can be heard by an individual. The term audio or verbal control means refers to audio or verbal format that can be verbalized or spoken by an individual to control a particular feature of the present invention.

Referring now to the drawings and particularly to FIG. 1 is a perspective view of the embodiment comprising the first embodiment of the display apparatus 10 attached to the shower or bath head's water supply piping 14 extending from a typical shower or bath wall 12, a water pipe union or joint 18, an articulated joint mechanism 22, and including a general shower head 16 in accordance with the present invention. The first embodiment of the show display apparatus 10 is designed to become attached to the shower or bath head's water supply piping in easily installation and aesthetically pleasing format. The components of the first embodiment of the present invention include a water pipe joint union or section 18, an extending or articulating joint section 22, and a housing section 20 containing the power source with a water proof removable cover 24, a computer apparatus and first 32, second 34 and third 36 parameter display mechanisms.

The water pipe union or joint 18 can be fabricated from typical metallic piping materials such as brass, brass alloys, steel, galvanized steel, copper, copper allows or any combination thereof. The water pipe joint can be fabricated from a number of polymeric materials, such as polyvinyl chloride (PVC), polyethylene, polybutylene, acryaontirile-butadiene-styrene (ABS), rubber modified styrene, polypropylene, polyacetal, polyethylene, or nylon. The base material can be painted white or colored finishes or coated with various brass, silver and gold type materials to accommodate the match with various presently marketed finishes. As shown in FIG. 2, the water pipe union generally has a female thread (not shown) within the input end 20 for engaging the treads of a typical water supply pipe and a male thread 19 on the output end 21 for engaging the female threads of the typical shower head 16 or bath supply means. For certain applications, the male/female thread locations can be changed to accommodate certain attachment forms or specifications. In addition, other attachment means, such as adhesive, snap fit joint, compression fitting, flare fitting or other technologies can be employed.

The material for fabricating the water pipe union 18 is not particularly important except that the joint has to engage the extending or articulating joint with a relatively water tight seal, and that preferably there should be a sealing means that functions 1) to secure in place, any parameter sensors that are projecting into the water stream and 2) to provide a water-tight seal that can prevent any water from penetrating past the seal (and into the shaft). Various washer designs fabricated from compounds of rubber, urethane, elastomeric or thermosetting polymeric compounds have been disclosed and are in present in similar uses. Seal and sealing technology is well known in the art. In addition, there should be a continuous lumen or means from the water pipe union and through the extending or articulating shaft such that the electrical connection means from the sensors can be engaged to the computer/display mechanism in the display housing 20. In is anticipated by the Applicant that the sealing means can be placed in another location, for example, on the other end of the shaft, in any preferable location. The joint between the water pipe union and the extending or articulating shaft could be screw and thread technology, snap fit, compression fitting, flare fitting, or use adhesive technology. For example, in the case of fabricating with a metallic component, a solder, brazed, or sweat joint could be used. For example, in the case of polymeric, the extending or articulating could be an extension of the display apparatus manufactured by molding, heat bonding, or adhesive technology. The joint may be designed to be permanent or removable.

The material for fabricating the extending or articulating shaft 22 can be a metallic material such as brass, brass and bronze alloys, steel, galvanized steel, copper, copper alloys or any combination thereof. The extending or articulating shaft can be fabricated from a number of polymeric materials, such as polyvinyl chloride (PVC), polyethylene, polybutylene, acryaontirile-butadiene-styrene (ABS), rubber modified styrene, polypropylene, polyacetal, polyethylene, or nylon. The base material can be painted white or colored finishes or coated with various brass, silver and gold type materials to accommodate the match with various presently marketed finishes.

The material for fabricating the extending or articulating shaft 22 is not particularly important except that the joint has to engage the water pipe union with a water tight seal, and that the other end should be designed to engage the display housing. In addition, the articulating may also have water protection means, such as have water tight joints the form the articulation, or surrounding the lumen and electrical connections with a protective jacket or barrier. Also, there should be a lumen or one or more holes for receiving the electrical connection means from the sensors. The extending or articulating shaft is engaged to the computer/display housing 20. The joint between the water pipe union and the extending or articulating shaft, as previously disclosed, could be screw and thread fitting, compression fitting, flare fitting, or use adhesive technology. For example, in the case of fabricating with a metallic component, a solder, brazed, or sweat joint could be used. For example, in the case of polymeric, the extending or articulating could be an extension of the display apparatus manufactured by molding, heat bonding, or adhesive technology. The joint may be designed to be permanent or removable.

Now referring to FIG. 2, the first embodiment of the present invention display apparatus 10 includes a housing 20, a computerized circuit board having a power source 87 (depicted in FIG. 5), the display means housing having a water tight door 24 for replacing or regenerating the power source (shown in FIG. 1) and an one or more buttons or activators that allow for certain modification of the software instructions (change units, input timing, alarms). The housing 20 can be fabricated from a metallic material such as brass, brass alloys, steel, galvanized steel, copper, copper allows or any combination thereof. The display means housing can be fabricated from a number of polymeric materials, such as polyvinyl chloride (PVC), polyethylene, polybutylene, acryaontirile-butadiene-styrene (ABS), rubber modified styrene, polypropylene, polyacetal, polyethylene, or nylon. The base material can be painted white or colored finishes or coated with various brass, silver and gold type materials to accommodate the match with various presently marketed finishes.

The material for fabricating the display means housing 20 is not particularly important except that the joint has to engage the extending or articulating joint with a water tight seal and be of sufficient size and weight to contain the electrical and power components housing. The size of the display means will generally determine the size of the housing but it does not have to be substantially rectangular as shown, any number of geometric configurations could be used in the present invention. In addition, the articulating may also have water protection means, such as have water tight joints the form the articulation, or surrounding the lumen and electrical connections with a protective jacket or barrier. Also, there should be a lumen or one or more holes for receiving the electrical connection means from the sensors. The extending or articulating can be engaged to the computer/display mechanism in the display housing. The joint between the water pipe joint and the extending or articulating joint could be screw and thread fitting, compression fitting, flare fitting, use adhesive technology. In the case of fabricating with a metallic component, a solder, brazed, or sweat joint could be used. In the case of polymeric, the extending or articulating could be an extension of the display apparatus manufactured by molding or heat bonding technology. The joint may be designed to be permanent or removable.

The display (as presented in FIG. 1 in general means 32, 34, and 36 and as presented in FIG. 2 in more detail 42, 44 and 46) utilizes one or more illuminating technologies, such as LCD, LED, gas plasma, fluorescence, incandescent, halogen, halide, or other lighting technologies but must able to provide sufficient lighting for observing the data in shower conditions. In addition, the display means and display means housing must be able to sustain capability in moist wet conditions. The present invention can include one or more than one display parameter. For example, a unit with only the temperature display can be manufactured to reduce overall costs. Furthermore, the orientation of the parameters 42, 44, and 46 presented can be changed, for example, the flow parameter can be on top with the time parameter on the bottom and with the temperature parameter sandwiched between. The displays 42, 44, and 46 can have a background light that is used for various purposes, for example, for providing better lighting conditions or changing color e.g. from green to red, to display an alarming condition. Displaying of all water parameters 42, 44 and 46 can utilize a gang multiple LCD, LED, gas plasma, fluorescence, incandescent, halogen, halide, or other lighting technologies separate displays, custom displays, graphic displays or a single line display which sufficient digits that sequences the presentation of the water parameters 42, 44, and 46 one at a time with a specific delay and sequencing. Only as an example, the LCD unit that can be used with the present invention is the color graphic 128×128 LCD-00569 marketed by Sparkfun Electronics in Boulder, Colo. It is anticipated by the Applicants that there are other variants and other LCD, LED, gas plasma, fluorescence, incandescent, halogen, halide, or other graphic or lighting technologies that can be utilized with the present invention.

Not shown in FIG. 1 or 2 (but described in more detail in 5), is a CPU or microprocessor and associated circuitry mounted on an electronic circuit board to control the display means and communicate with the sensors. The CPU or microprocessor and associated circuitry mounted on an electronic circuit board can also have the capability to be programmed for controlling certain display means (e.g. U.S. or metric units), programming certain alarm or setting states (e.g. flash all display means red when the total volume has exceeded a certain volume, for example, 15 gallons).

The display assembly can be programmed to display one or more parameters in a visual means that can be either an analog, character or digital display, or combination of display means. Information obtained from the appropriate sensor monitoring or measuring the water parameters such as temperature, shower time (water on), and flow rate can be displayed in an appropriate format on the display means. For example, when a sensor is monitoring the shower temperature of water flowing through the shower head, the display means could show any temperature between 32 degrees Fahrenheit (0 degrees Celsius) and 212 degrees Fahrenheit (100 degrees Celsius), and within a reasonable range of 50 degrees Fahrenheit (10.0 degrees Celsius) and 150 degrees Fahrenheit (65.5 degrees Celsius). For example, when a sensor is monitoring or measuring the rate of water flowing from a water source or through the shower head, the display means could show any flow between 0 gal/min (0 liters/hr) and 100 gal/min, within a reasonable range of 0.2 gal/min (liter/min) to 20 gal/min (liters/min). In additional, when a sensor is monitoring or measuring the rate of water flowing from a water source or through the shower head, the display means could show the total volume of water that has been used, e.g. 23 gallons. Furthermore, the display can be programmed to display calendar information, such as the date and current time (12 hr. or 24 hr. format).

It is anticipated by the Applicant the present invention can be fabricated and marketed with one, two or more display means. For example, a lower cost display assembly can be fabricated and sold that only has a temperature sensor and temperature display means. A more expensive display assembly can be fabricated and sold that has temperature, flow, timing and other sensors with various programmed methods and a shut off mechanism.

Also shown in FIG. 2, one or more ergonomically 50, 52, and/or 54 placed buttons or activators can be incorporated into the display means housing to allow the modification of certain parameter units (e.g. metric to US), set alarm conditions (e.g. temperature over-set point, time past-set point, flow rate-set points), or to program certain settings, e.g. total shower time before shutdown or alarm, monitor continuous leakage (valve not complete shut off). The buttons will electrically communicate with the electronic circuit board contained with the housing 20 and respond to programmed instructions integrated within the CPU or microprocessor and associated circuitry of the electronic circuit board. The buttons or activators 50, 52 and/or 54 should be mounted with the display means housing 20 with the capability to protect the buttons and electronic circuitry with the housing for exposure to moist and wet conditions. The buttons or activators 50, 52, and 54 can be replaced by using a display means with touch screen capability. The LCD unit described above as an example to be used with the present invention is the color graphic 128×128 LCD-00569 presently marketed by Sparkfun Electronics in Boulder, Colo. can be ordered with touch screen capability. The touch screen or tablet type capability can allow for modifications of certain parameter units or program certain settings. It is anticipated by the Applicant that numerous other graphic or lighting displays with touch screen or tablet type capability may be utilized with the present invention.

A visual alarm can be incorporated into the present invention whereby a preset alarm or programmed alarm, changes the screen display, for example, blinking a parameter, or changing the color of a parameter (green to red). A preset alarm might include visual reference, for example, an inoperative condition, broken sensor, low power source and some default limits. Programmed visual alarms would allow for individual selection (e.g. temperature over set point, time past set point, flow rate, total volume exceeded set points) which might be restricted or not by the default settings.

In addition, an auditory alarm can be incorporated into the present invention whereby a preset alarm or programmed alarm, changes the screen display, for example, using sound or pulsing a specific noise, or changing the color of a parameter. For example, the temperature display can change from green to red when a preset temperature is crossed. A preset alarm might include visual reference, for example, an inoperative condition, broken sensor, low power source and some default limits. Programmed auditory alarms would allow for individual selection (e.g. temperature over set point, time past set point, flow rate set points) which might be restricted or not by the default settings.

In addition, the present invention can include water shut off means (not shown) to turn the shower or bath water off if an alarm or setting has been activated. The water shut off means is electrically connected to the CPU or microprocessor and the power means such the computer controls the application of electrical power to activate or de-activate the water shut off means. The water shut off means can comprise, for example, a typical ball valve or solenoid shut off valve incorporate into the connection union such that water from the source is closed such that no water exits the shower or bath water head. The water shut off means can be activated if an alarm state has been achieved, e.g. shower time of 10 minutes and 10 seconds has expired, or temperature is above 115 degrees Fahrenheit, or the total of 15 gallons of water has flowed since the water source was opening. The alarm or settings can be a default setting installed by the manufacturer or programmed by the user. In addition, the typical on-off ball valve or solenoid shut off valve can have a programmable on-off sequence for other purposes, for example, water conservation purposes (e.g. programmed for initial rising 5 minutes and 5 seconds, off for 4 minutes and 4 seconds to apply soap or shampoo, and then on again for 5 minutes and 5 seconds for rising the soap or shampoo off). The times shown above are only provided as an example. The time e.g. 5 minutes and 5 seconds, can be programmed as desired by the user to accomplish the personal needs, e.g. 10 minutes.

In the embodiment defined by the attached shower display apparatus, know piping joint technology, as described above, will be used for installation into both new and presently installed shower and bath systems.

In the embodiment defined by the display means incorporated into the shower head, the shower head/display assembly can also be installed in both new and presently installed shower systems.

As illustrated in FIG. 3 is a cross-section taken from the 3-3 line on FIG. 2 showing the sensors 70, 72 and 74 located within a piping joint connection 22 and there relative position of the sensors in the supply line lumen 38 and the connecting wires 71, 73, and 75 for the display means.

In general, a sensor is a type of transducer. A direct type indicating sensors, for example, a mercury thermometer, is human readable. However, other sensors must be paired with an indicator or display, for instance, thermocouple sensor. Most sensors are electrical or electronic, although other types exist.

Technological progress allows for more and more to be manufactured on the microscopic scale as micro-sensors using MEMS technology. In most cases a micro-sensor reaches a significantly higher speed and sensitivity compared with macroscopic approaches.

There are many types of sensors that can be used with the present invention. Since a significant small change involves an exchange of energy, sensors can be classified according to the type of energy transfer that they detect. For measuring or monitoring the temperature of the water flowing from the shower or bath head, the use of various thermocouples or thermistor sensors 70 as depicted in FIG. 3 is protruding within the water supply lumen 38 (or in close proximity to the water to be measured) and mounted within the articulating joint mechanism 22. Wires 71 are shown extending from the sensor 70 to electronically communicate with the CPU or microprocessor 84 and display unit.

In 1821, the German-Estonian physicist Thomas Johann Seebeck discovered that when any conductor (such as a metal) is subjected to a thermal gradient, it will generate a voltage. This is now known as the thermoelectric effect or Seebeck effect. Any attempt to measure this voltage necessarily involves connecting another conductor to the "hot" end. This additional conductor will then also experience the temperature gradient, and develop a voltage of its own which will oppose the original. Fortunately, the magnitude of the effect depends on the metal in use. Using a dissimilar metal to complete the circuit will have a different voltage generated, leaving a small difference voltage available for measurement, which increases with temperature. This difference can typically be between 1 and 70 micro-volts per degree Celsius for the modern range of available in metal combinations. Certain combinations have become popular as industry standards, driven by cost, availability convenience, melting points, chemical properties, stability, and output.

It is important to note that thermocouples measure the temperature difference between two points, not absolute temperature. In traditional applications, one of the junctions, the cold junction, was maintained at a known (reference) temperature, while the other end was attached to a probe.

For example, the cold junction could be at copper traces on the circuit board. Another temperature sensor will measure the temperature at this point, so that the temperature at the probe lip can be calculated. Having available a known temperature cold junction, while useful for laboratory calibrations, is simply not convenient for most directly connected indicating and control instruments. They incorporate into their circuits an artificial cold junction using some other thermally sensitive device (such as a thermistor or diode) to measure the temperature of the input connections at the instrument, with special care being taken to minimize any temperature gradient between terminals. Hence, the voltage from a known cold junction can be simulated, and the appropriate connection applied. This is known as cold junction compensation.

Additionally, cold junction compensation can be performed by software. Device voltages can be translated into temperatures by two methods. Values cast either be found in look-up tables or approximated using polynomial coefficients.

Any extension cable or compensating cable must be selected to match die thermocouple. It generates a voltage proportional to the difference between the hot junction and cold junction, and is connected in the correct polarity so that the additional voltage is added to the thermocouple voltage, compensating for die temperature difference between the hot end cold junctions.

The relationship between the temperature difference and the output voltage of a thermocouple is generally nonlinear and is approximated by a polynomial interpolation.

$$T = \sum_{n=0}^{N} a_n v^n$$

The coefficients $a_n$ are given for n from 0 to between 5 and 9. To achieve accurate measurements lie equation is usually implemented in a digital controller or stored in a lookup table. Some older devices use analog filters.

A variety of thermocouples are available, suitable for different measurements applications (industrial, scientific, food temperature, medical research, etc.). They are usually selected based on the temperature range and sensitivity needed. Thermocouples with low sensitivities (B, R, and S types) have correspondingly lower resolutions. Other selection criteria include the inertness of the thermocouple material, and whether or not it is magnetic. The thermocouple types are listed below with the positive electrode first, followed by the negative electrode. For example, listed below are a number of thermocouples types.

Type K—Chromel (Nickel-Chromium Alloy)/Alumel (Nickel-Aluminum Alloy). This is the most commonly used general purpose thermocouple. It is inexpensive and, owing to its popularity, available in a wide variety of probes. They are available in the 200° C. to +1200° C. range. Time type K was specified at a time when metallurgy was less advanced than it is today and, consequently, characteristics vary considerably between examples. Another potential problem arises in sonnies situations since one of the constituent materials is magnetic (Nickel). The characteristic of the thermocouple undergoes a step change when a magnetic material readies its Curie point. This occurs for this thermocouople at 354° C. Sensitivity is approximately 41 µV/° C.

Type B—Chromel/Constantan (Copper-Nickel Alloy). Type B has a high output (65 µV/° C.) winch makes it well suited to cryogenic use. Additionally, it is non-magnetic.

Type J—Iron/Constantan. Type J has a limited range (−40 to +750° C.) makes type J generally less popular than type K. The main application is with old equipment that cannot accept modern thermocouples. J types cannot be used above 760° C. as an abrupt magnetic transformation causes permanent de-calibration. The magnetic properties also prevent use in some applications. Type J's have a sensitivity of ~52 µV/° C.

Type N—Nicrosil (Nickel-Chromium-Silicon Alloy)/Nisil (Nickel-Silicon Alloy). Type N thermocouples generally have high stability and resistance to high temperature oxidation which makes Thpe N suitable for high temperature measurements with out the cost of platinum (B, R, 5) types. They can withstand temperatures above 1200° C. Sensitivity is about 39 µV/° C. at 900° C., slightly lower than a Type K. Designed to be an improved type K, it is becoming more popular.

Thermocouple types B, R, and S are all noble metal thermocouples and exhibit similar characteristics. They are the most stable of all dieimocouples, but due to their low sensitivity (approximately 10 µV/° C.) they are usually only used for high temperature measurement (>300° C.).

Type B—Platinum 30% Rhodium/Platinum 6% Rhodium. Suited for high temperature measurements up to 1800° C. Type B thermocouples (due to the shape of there temperature-voltage curve) give the same output at 0° C. and 42° C. This makes them useless below 50° C.

Type R—Platinum 13% Rhodium/Platinum. Suited for bight temperature measurements up to 1600° C. Low sensitivity (10 µV/° C.) and high cost makes Type R unsuitable for general purpose use.

Type S—Platinum 10% Rhodium/Platinum. Suited for high temperature measurements up to 1600° C. Low sensitivity (10 µV/° C.) and high cost makes them unsuitable for general purpose use. Due to its high stability, Type S is used as the standard of calibration for the melting point of gold (1064.43° C.).

Type T—Copper/Constantan. Suited for measurements in the −200 to 350° C. range. Often used as a differential measurement since only copper wire touches the probes. As both conductors are non-magnetic, type T thermocouples are a popular choice for applications such as electrical generators which contain strong magnetic fields. Type T thermocouples have a sensitivity of ~43 µV/° C.

Type C—Tungsten 5% Rhenium/Tungsten 26% Rhenium. Suited for measurements in the 32 to 4208° F. (0 to 2320° C.).

This thermocouple is well-suited for vacuum furnaces at extremely high temperature and must never be used in the presence of oxygen at temperatures above 500° F.

Type M—Nickel Alloy 19/Nickel-Molybdenum Alloy 20. This type is used in the vacuum furnaces as well for the same reasons as with type C above. Upper temperature is limited to 2500° F. (1400° C.). Though it is a less common type of thermocouple, look-up tables to correlate temperature to EMF (mini-volt output) are available.

A thermistor is a type of resistor used to measure temperature changes, relying on the change in its resistance with changing temperature. Thermistor is a combination of time words thermal and resistor. The thermistor was invented by Samuel Ruben in 1930, and was disclosed in U.S. Pat. No. 2,021,491.

If we assume that the relationship between resistance amid temperature is linear (i.e. we make a first-order approximation), then we can say that:

$$\Delta R = K \Delta T$$

Where:
$\Delta R$ change in resistance
$\Delta T$ = change in temperature
k=first-order temperature coefficient of resistance Thermistors can be classified into two types depending on the sign of k. If k is positive, the resistance increases with increasing temperature, and the device is called a positive temperature coefficient (PTC) thermistor (Posistor). If is negative, the resistance decreases with in decreasing temperature, and the device is call a negative temperature coefficient (NTC) thermistor.

Thermistors differ from resistance temperature detectors in that the materials used in a thermistor is generally a ceramic or polymer, while RTDs use pure metals. The temperature response is also different; RTDs are useful over larger temperature ranges.

Other thermal technologies that can be employed include temperature sensors: thermometers, bi-metal thermometers and thermostats, heat sensors such as bolometers and calorimeter.

It is anticipated by the Applicant that various types of thermocouples or thermistors can be used for the present invention. It is not important what type of thermocouple or thermistor is utilized for monitoring or measuring the temperature of the water entering the shower head, bath head or water supply lines except that it is accurate for the appropriate temperature range monitored or measured.

In order to monitor or measure the flow rate of the water being delivered by the water supply line to the shower or bath head various flow measuring technologies are applicable to the present invention. For measuring or monitoring the rate of the water flowing through the shower or bath head, the use of various venturi type sensors or pressure sensors 74 as depicted in FIG. 3 are positioned in close proximity to the water to be measured and mounted within the articulating joint mechanism 22. Wires 75 are shown extending from the sensor 74 to electronically communicate with the CPU or microprocessor 84 and display unit.

One means to monitor flow parameter is to create a venturi, which constricts the flow in some fashion, and measure the differential pressure that results across the constriction. This method is widely used to measure flow rate in the transmission of gas or liquids trough pipelines, and has been used since Roman Empire times. The venturi effect is all example of Bernoulli's principle, in the case of incompressible fluid flow through a tube or pipe with a constriction in it. The fluid velocity must increase through the constriction to satisfy the equation of continuity, while its pressure must decrease due to conservation of energy: the gain in kinetic energy is supplied by a drop in pressure or a pressure gradient force. The effect is named after Giovanni Battista Venturi, (1746-1822), an Italian physicist.

Using Bernoulli's equation in the special case of incompressible fluids (such as the approximation of a water jet), the theoretical pressure drop at the constriction would be given by the formula:

$$(p2)(v_2^2 - v_1^2)$$

In addition, the flow sensor 74 can be fabricated from pressure sensor technology. Pressure sensors are used in numerous ways for control and monitoring in thousands of everyday applications. Pressure sensors can be used in systems to measure other variables such as fluid/gas flow, speed, water level, and altitude. Pressure sensors can alternatively called pressure transducers, pressure transmitters, pressure senders, pressure indicators among other names.

Pressure sensors can vary considerably in technology, design, performance, application suitability and cost. A conservative estimate would be that there may be over 50 technologies and at least 300 companies making pressure sensors worldwide.

There are also a category of pressure sensors that are designed to measure in a dynamic mode for capturing very high speed changes in pressure. Example applications for this type of sensor would be in the measuring of combustion pressure in a engine cylinder or in a gas turbine. These sensors are commonly manufactured out of piezoelectric materials like quartz.

Some pressure sensors function in a binary manner, i.e., when pressure is applied to a pressure sensor, the sensor acts to complete or break an electrical circuit. Some speed cameras use them. These types of sensors are also known as a pressure switches.

In addition, various flow measuring technologies can be utilized as the flow sensor 74. In general, a flow sensor is a device for sensing the rate of fluid flow. Typically a flow sensor is the sensing element used in a flow meter, or flow logger, to record the flow of fluids. There are various kinds of flow meters, including some that have a vane that is pushed by the fluid, and can drive a rotary potentiometer, or similar device. Other flow meters use a displacement piston, pushing it against a spring. Flow meters are related to devices called velocimeters that measure velocity of fluids flowing through them. Laser-based interferometry is often used for air flow measurement, but for liquids, it is often easier to measure the flow. Another approach is Doppler-based methods for flow measurement. Hall effect sensors may also be used, on a flapper valve, or vane, to sense the position of the vane, as displaced by fluid flow. A fluid dynamics problem is easily solved (especially in non-compressible fluids) by knowing the flow at all nodes in a network. Alternatively, pressure sensors can be placed at each node, and the fluid network can be solved by knowing the pressure at every node. These two situations are analogous to knowing the currents or knowing the currents at every node (noncompressible fluid being conserved in the same manner as Kirchoff's current or voltage laws, in which conservation of fluid is analogous to conservation of electrons in a circuit). Flow meters generally cost more than pressure sensors, so it is often more economical to solve a fluid dynamics network monitoring problem by way of pressure sensors, than to use flow meters.

In addition, there are several types of mechanical flow meters that can be utilized with the present invention as the flow sensor 74 that are listed below.

Piston Meter—Due to the fact that they used for domestic water measurement Piston meters, (also known as Rotary Piston, or Semi-Positive displacement meters) are the most common in the UK and are used for almost all meter sizes up to and including 40 mm (1½"). The piston meter operates on the principle of a piston rotating within a chamber of known volume. For each rotation, an amount of water passes through the piston chamber. Through a gear mechanism and, sometimes, a magnetic drive, a needle dial and odometer type display is advanced.

Woltmann Meter-Woltman meters, commonly referred to as Helix meters are popular at larger sizes. Jet meters (single or Multi-Jet) are increasing in popularity in the UK at larger sizes and are commonplace in the EU.

Dall Tube—A shortened form of the Venturi. Lower pressure drop than an orifice plate.

Orifice Plate—Another simple method of measurement uses an orifice plate, which is basically a plate with a hole through it. It is placed in the flow and constricts the flow. It uses the same principle as the venturi meter in that the differential pressure relates to the velocity of the fluid flow (Bernoulli's principle).

Pitot tube—Measurement of the pressure within a pitot tube in the flowing fluid, or the cooling of a heated element by the passing fluid are two other methods that are used. These types of sensors are advantageous in that they are rugged, so not easily damaged in an extreme environment. A pitot tube is an L shaped tube which is also able to measure fluid flow.

Paddle wheel—The paddle wheel translates the mechanical action of paddles rotating in the liquid flow around an axis into a user-readable rate of flow (gpm, lpm, etc.). The paddle tends to be inserted into the flow.

Pelton wheel—The Pelton wheel turbine (better described as a radial turbine) translates the mechanical action of the Pelton wheel rotating in the liquid flow around an axis into a user-readable rate of flow (gpm, lpm, etc.). The Pelton wheel tends to have all the flow travelling around it.

Turbine flow meter—The turbine flowmeter (better described as an axial turbine) translates the mechanical action of the turbine rotating in the liquid flow around an axis into a user-readable rate of flow (gpm, lpm, etc.). The turbine tends to have all the flow travelling around it.

Thermal mass flow meters—Thermal mass flow meters generally use one or more heated elements to measure the mass flow of gas. The gas temperature is also measured and compensated for. They provide a direct mass flow readout, and do not need any additional pressure temperature compensation over their specified range. Thermal mass flow meters are used for compressed air, nitrogen, helium, argon, oxygen, natural gas. In fact, most gases can be measured as long as they are fairly clean and non-corrosive.

Vortex flowmeters—Another method of flow measurement involves placing an object (called a shedder bar) in the path of the fluid. As the fluid passes this bar, disturbances in the flow called vortices are created. The vortices trail behind the cylinder in two rolls, alternatively from the top or the bottom of the cylinder. This vortex trail is called the Von Kármán vortex street after von Karman's 1912 mathematical description of the phenomenon. The speed at which these vortices are created is proportional to the flow rate of the fluid. Inside the shedder bar is a piezoelectric crystal, which produces a small, but measurable, voltage pulse every time a vortex is created. The frequency of this voltage pulse is also proportional to the fluid flow rate, and is measured by the flowmeter electronics. With f=SV/L where, f=the frequency of the vortices L=the characteristic length of the bluff body V=the velocity of the flow over the bluff body S=Strouhal Number and is a constant for a given body shape.

In addition, various magnetic, ultrasound and coriolis flow meters can be utilized with the present invention to function as the flow sensor 74. Modern innovations in the measurement of flow rate incorporate electronic devices that can correct for varying pressure and temperature (i.e. density) conditions, non-linearities, and for the characteristics of the fluid. The most common flow meter apart from the mechanical flow meters, is the magnetic flow meter, commonly referred to as a "mag meter" or an "electromag". A magnetic field is applied to the metering tube, which results in a potential difference proportional to the flow velocity perpendicular to the flux lines. The physical principle at work is Faraday's law of electromagnetic induction. The magnetic flow meter requires a conducting fluid, e.g. water, and an electrical insulating pipe surface, e.g. a rubber lined non magnetic steel tube.

Ultrasonic flow meters—Ultrasonic flow meters measure the difference of the transit time of ultrasonic pulses propagating in and against flow direction. This time difference is a measure for the average velocity of the fluid along the path of the ultrasonic beam. By using the absolute transit times both the averaged fluid velocity and the speed of sound can be calculated. Using the two transit times $t_{up}$ and $t_{down}$ and the distance between receiving and transmitting transducers L and the inclination angle $\alpha$ one can write the equations:

$$v = \frac{L}{2\sin(\alpha)} \frac{t_{up} - t_{down}}{t_{up} t_{down}} \text{ and } c = \frac{L}{2} \frac{t_{up} + t_{down}}{t_{up} t_{down}}$$

Where v is the average velocity of the fluid along the sound path and c is the speed of sound.

Measurement of the doppler shift resulting in reflecting an ultrasonic beam off the flowing fluid is another recent innovation made possible by electronics. By passing an ultrasonic beam through the water pipe, bouncing it off of a reflective plate then reversing the direction of the beam and repeating the measurement the volume of water flow can be estimated. The speed of transmission is affected by the movement of water in the supply pipe and by comparing the time taken to complete the cycle upstream versus downstream the flow of water through the supple pipe can be measured. The difference between the two speeds is a measure of true volume flow. A wide-beam sensor can also be used to measure flow independent of the cross-sectional area of the water supply pipe.

Coriolis flow meters—Using the Coriolis effect causes a laterally vibrating tube to distort, a direct measurement of mass flow can be obtained in a coriolis flow meter. Furthermore a direct measure of the density of the fluid is obtained. Coriolis measurement can be very accurate irrespective of the type of gas or liquid that is measured; the same measurement tube can be used for hydrogen gas and peanut butter without recalibration.

Laser-doppler flow meter. Fluid flow can be measured through the use of a monochromatic laser diode. The laser probe is inserted into a water pipe and turned on, where the light scatters and a small portion is reflected back to the probe. The signal is then processed to calculate flow within the water pipe. There are limitations to the use of a laser doppler probe since the water flow within a water pipe is dependent on volume illuminated, which is often assumed rather than measured and varies with the optical properties of the water pipe. In addition, variations in the type and placement of the probe within identical water pipes result in variations in reading. The laser doppler has the advantage of sampling a small volume of water, allowing for great precision, but does not necessarily represent the flow within an entire water system. The flow meter is more useful for relative rather than absolute measurements.

Also shown in FIG. 3, is a timing sensor 72. The timing sensor can communicate with the CPU or microprocessor to display such information such as the time of day and current date and/or the totally duration that the water supply has been on before it was turned off. In order to monitor the initial time and duration of the water being delivered by the water supply line to the shower or bath head various timing measuring technologies are applicable to the present invention. For monitoring the initial time and duration of the water flowing through the shower or bath head, the use of various trip switches or water sensors 72 as depicted in FIG. 3 are positioned in close proximity to the water to be monitored and mounted within the articulating joint mechanism 22. Wires 77 are shown extending from the sensor 74 to electronically communicate with the CPU or microprocessor 84 and display unit. Various mechanical and magnetic switches can be utilized to communicate a signal to the CPU or microprocessor 84 that water supply has been initiated and then the software instructions and CPU or microprocessor can display the cumulative time that the water supply is flowing through the shower or bath head. The mechanical or magnetic switch will have the capability to also communicate a signal to the CPU or microprocessor 84 that the water supply has been shut off such that the software instructions and CPU or microprocessor can calculate various parameters, such as, but not limited to, the duration of water supply, total number of gallons or liters of water used and flow rates. In addition, the microprocessor can keep track of the timing parameter and provide instructions to conduct certain operations, e.g. send out a verbal or audio signal, turn or or off a control valve means.

Technologies that can be use as the timing sensor 72 include electrical resistance sensors, ohm meter, multimeter electrical current sensors: galvanometer, ammeter, electrical voltage sensors: leaf electroscope, voltmeter electrical power sensors, watt-hour meters magnetism sensors, magnetic compass, fluxgate compass, magnetometer, Hall effect device. In addition, various chemical technologies, such as oxygen sensors, ion-selective electrodes, and redox electrodes might be used. Furthermore, optical radiation technology can be used as the timing sensor, such as light sensors, on photo-detectors including semi-conduction devices such as photocells, photodiodes, phototransistors, CCDs, and image sensors; vacuum tube devices like photo-electric tubes, photomultiplier tubes, and mechanical instruments such as the Nichols radiometer, infra-red sensors, especially used as occupancy sensors for lighting and environmental controls, interferometry-interference fringes between transmitted and reflected light-waves produced by a coherent source such as a laser are counted and the distance is calculated. In addition, fiber optic sensors are capable of extremely high precision.

FIG. 4 is a perspective view of the second embodiment showing the display apparatus incorporated within the shower head in accordance with the present invention. It is anticipated by the Applicant that the technology of the present invention can also be incorporated within a faucet head (not shown).

The display (as presented in FIG. 4 in general means 64, 66, and 68 utilizes one or more illuminating technologies, such as LCD, LED, gas plasma, fluorescence, incandescent, halogen, halide, or other lighting technologies but must able to provide sufficient lighting for observing the data in shower conditions. In addition, the display means must be able to sustain capability in moist wet conditions. The present invention can include one or more than one display parameter. For example, a unit with only the temperature display can be manufactured to reduce overall costs. Furthermore, the orientation of the parameters 64, 66, and 68 presented can be changed, for example, the flow parameter can be on top with the time parameter on the bottom and with the temperature parameter sandwiched between. The displays 64, 66, and 68 can have a background light that is used for various purposes, for example, for providing better lighting conditions or changing color e.g. from green to red, to display an alarming condition. Displaying of all water parameters 42, 44 and 46 can utilize a gang multiple LCD, LED, gas plasma, fluorescence, incandescent, halogen, halide, or other lighting technologies separate displays, custom displays, graphic displays or a single line display which sufficient digits that sequences the presentation of the water parameters 42, 44, and 46 one at a time with a specific delay and sequencing. An example of a LCD unit that can be used with the present invention is the color graphic 128×128 LCD-00569 marketed by Sparkfun Electronics in Boulder, Colo. It is anticipated by the Applicants that there are other variants and other LCD, LED, gas plasma, fluorescence, incandescent, halogen, halide, or other lighting technologies that can be utilized with the present invention.

Not shown is the position or location of the temperature sensor 70, flow parameter sensor 72, and timing sensor 74. The technology described for the first embodiment 10 is incorporated by reference for the purpose of using this technology to perform the monitoring and measuring of water parameters for this second embodiment 60 of the present invention.

Not shown in FIG. 4 but described in more detail in 5, is an CPU or microprocessor and associated circuitry mounted on a electronic circuit board and contained within the shower head to control the display means and communicate with the sensors. The CPU or microprocessor and associated circuitry mounted on the electronic circuit board can also have the capability to be programmed for controlling certain display means (e.g. U.S. or metric units), programming certain alarm or setting states (e.g. flash all display means red when the total volume has exceeded a certain volume, for example, 15 gallons).

Also not shown in FIG. 4, one or more ergonomically placed buttons or activators can be incorporated into the shower head to allow the modification of certain parameter units (e.g. metric to US), set alarm conditions (e.g. temperature over set point, time past set point, flow rate set points), or to program certain settings, e.g. total shower time before shutdown or alarm, monitor continuous leakage (valve not complete shut off). The buttons will communicate with the electronic circuit board contained with the shower head 60 and respond to programmed instructions integrated within the CPU or microprocessor and associated circuitry of the electronic circuit board. The buttons or activators should be mounted with the shower head with the capability to protect the buttons and electronic circuitry with the shower head for exposure to moist and wet conditions. Alternately, the display means 64, 66, and 68 can be have touch screen or tablet type capability to allow for modifications of certain parameter units or program certain settings.

Shown surrounding the display means 64, 66, and 68, are plurality of holes 62 for projecting water or water spray from the water source for a typical shower dispensing process. The orientation of the display and plurality of holes is anticipated by the Applicant to be modified to accommodate various shower head designs.

FIG. 5 shows an electrical schematic showing the main power 87, power supply lines 85 and 88 for CPU or microprocessor 84, the CPU or microprocessor 84, and the analog or digital display means 80 with a data transfer means 83 and with a power line 81 and a ground line 82.

Also shown in FIG. 5 is a timing clock integrated circuit 88 with data transfer means 89 for communicating with the CPU or microprocessor 84 and having a power line 90 and ground line 91, a temperature integrated circuit 93 with a date transfer means 92 for communicating with the CPU or microprocessor 84 and having a power line 96 and ground 97, and the flow sensor (pressure) integrated circuit 95 with a data transfer means 94 for communicating with the CPU or microprocessor 84 with a power line 98 and ground line 99. The integrated circuits for the timing clock, temperature sensor and flow sensor can include circuitry to convert analog data to a digital format.

The microprocessor that processes the information supplied by the temperature 70, flow 74 and timing 72 sensors uses internal instructions to control the information projected on the display 80 and for processing alarm states. The microprocessor can include an EEPROM or any type of memory section that allows for specific programming to be incorporated as processing instructions. Furthermore, the microprocessor may have the capability to convert analog signals into digital information for decoding and processing. An example of a microprocessor that could be used for the CPU or microprocessor is the PIC16F876 28-pin 8-Bin CMOS FLASH micro-controllers manufactured by Microchip Technology, Inc. This particular microprocessor has a 128K EEPROM Data memory bank for flash memory of specific instructions and utilizes a 35-word instruction set. It also has five 10-bit Analog-to-Digital Inputs that can provide the means for converting the information obtained from the temperature sensor 70, flow sensor 74, and/or timing sensor 72 from its analog format into a digitized form for processing by the instruction sets of the CPU or microprocessor 84. Another example of a microprocessor that could be used for the CPU or microprocessor is the MSP430 family of processors from Texas Instruments in Dallas, Tex. There are hundreds of variants but for an example, the MSP430F436IPN (80 pin package) or MSP430F436IPZ (100 pin package) could be utilized in the present invention. It is anticipated by the Applicant that more powerful microprocessors with more memory capacity may be utilized to accommodate the more complex audio or verbal communications means. There are many other variants or other microprocessors, whether commercially marketed or privately fabricated, that can be used with the present invention.

In addition, a means to record the water parameters or data can be incorporated into the present invention. An integrated memory circuit can be incorporated into the CPU or microprocessor and associated circuitry with a means to transfer the recorded data to a removable media, such as a flash mounted on an electronic circuit board to control the display means and communicate with the sensors. The CPU or microprocessor and associated circuitry mounted on the electronic circuit board can also have the capability to be programmed for controlling certain display means (e.g. U.S. or metric units), programming alarm or setting states (e.g. flash all display means red when the total volume has exceeded a certain volume, for example, 15 gallons).

In addition, it is anticipated that the sensor analog (or digital) data that is communicated either through direct wiring or through a wireless means that is then amplified by a circuit and connected to the microprocessor 84 through one of the analog-to-digital modules (if necessary). It is also anticipated by the Applicants that the display means 20 of the first embodiment can be located remotely from the sensor and CPU or microprocessor 84 with data transfer means 83 communicated wirelessly. Hence, the data transfer mean 83 can be used to transfer water parameters to a remotely positioned receiver apparatus. It is also possible to have a local data means 20 together with a remotely located data receiver apparatus. The data transfer means 83 can use radio-frequency, Bluetooth, Zigbee, WiFi, optical or other wireless technology for transferring the water parameter data generated by the sensors and collected by the microprocessor and sent to a wireless to a display means 20 and/or a remotely positioned receiver apparatus. Display means 20 and/or a remotely positioned receiver apparatus can have the function allows an individual or entity to review that data for auditing or monitoring purposes. This could be useful in commercial operations, such as in hotels, motels, work-out facilities or other commercial operations that allows individuals to use water supplies whereby the wireless transfer means or communication 83 can be sent to a remote receiver that displays or records the water parameters. For example, a particular hotel chain might allow guests to use a certain quantity of water for shower purposes, e.g. 35 gallons per day. Maids or other individuals having access to the individual's room can have a display means 20 that monitors and records the amount water used per day. If the individual uses 40 gallons per day, the hotel chain will have water parameter data to add an additional charge to the individual hotel bill for the additional water usage. Examples of Bluetooth modules (using the 2.4 GHz band as WiFi) that can be added to the present invention are the RN-4.1 Bluetooth modules available from Roving Networks in Los Gatos, Calif., the KC-41, KC 11.4, KC-5100, KC-216 or KC-225 data serial modules from KC Wireless in Tempe Ariz., and/or the BT-21 module from Amp'ed RF wireless solutions in San Jose, Calif. Examples of wireless protocols that can be utilized with the present invention include, but are not limited to, the IEEE 802.11a, IEEE 802.11b, IEEE 802.11g and IEEE 802.11n modulation techniques. Applicants recognize that there are numerous wireless protocols that have been developed that, although not specifically listed, could be utilized with the present invention for data transfer purposes.

In addition, the wireless or wire data transfer can be connected to the Internet using the IP or DHCP protocols whereby the data can be monitored remotely over the Internet using a software program designed to record, display, analyze and/or audit the water parameter data. The present invention would probably have to "log on" to a server to report the water parameters or it could respond to queries once its presence is known to the server.

Also some wireless routers support a form of "private" point-to-point or bridging operation which could be used to transfer water parameter data from the present invention to a receiving apparatus. Other kinds of proprietary protocols to be used with the present invention are possible as well. For example, there are the ISM (industrial, scientific and medical) bands. The ISM bands are defined by the ITU-R in 5.138, 5.150, and 5.280 of the Radio Regulations. Individual countries' use of the bands designated in these sections may differ due to variations in national radio regulations. Because communication devices using the ISM bands must tolerate any interference from ISM equipment, these bands are typically given over to uses intended for unlicensed operation, since unlicensed operation typically needs to be tolerant of interference from other devices anyway. In the United States of America, ISM uses of the ISM bands are governed by Part 18 of the FCC rules, while Part 15 Subpart B contains the rules for unlicensed communication devices, even those that use the ISM frequencies. Part 18 ISM rules prohibit using ISM for communications.

The ISM bands defined by the ITU-R are:

| Frequency range [Hz] | Center frequency [Hz] | Availability |
|---|---|---|
| 6.765-6.795 MHz | 6.780 MHz | Subject to local acceptance |
| 13.553-13.567 MHz | 13.560 MHz | |
| 26.957-27.283 MHz | 27.120 MHz | |
| 40.66-40.70 MHz | 40.68 MHz | |
| 433.05-434.79 MHz | 433.92 MHz | Region 1 only |
| 902-928 MHz | 915 MHz | Region 2 only |
| 2.400-2.500 GHz | 2.450 GHz | |
| 5.725-5.875 GHz | 5.800 GHz | |
| 24-24.25 GHz | 24.125 GHz | |
| 61-61.5 GHz | 61.25 GHz | Subject to local acceptance |
| 122-123 GHz | 122.5 GHz | Subject to local acceptance |
| 244-246 GHz | 245 GHz | Subject to local acceptance |

While currently the 430 MHz and 900 MHz frequencies are commonly used in the US, it is anticipated by the Applicants that the other frequencies could be used for water parameter transfers such as Zigbee.

Another protocol known as CAN or CAN-bus (ISO 11898-1) that was originally designed for automotive applications, but now moving into industrial applications is another type of network that could be used to transfer water parameter data. Devices that are connected by a CAN network are typically sensors, actuators and control devices. A CAN message never reaches these devices directly, but instead a host-processor and a CAN Controller is needed between these devices and the bus.

Also shown in FIG. 5 is a speaker or chiming electro-acoustic transducer 110 for producing various sounds or verbal information. In the simplest form, the speaker can send out chiming or ring or other non-descript sounds to alert an individual of a particular situation, such as the desired temperature has been reached or an alarm state has been detected. In a more advanced form, the speaker can verbalize certain parameter information or provide confirmatory responses to verbal or auditory commands.

Also shown in FIG. 5 is a microphone 112 for detecting audio or voice commands that communicates with the microprocessor which includes instructions to perform certain activities, such as turning on and off the water supply or display certain water parameters.

Now turning to FIG. 6 which shown a perspective view showing the display apparatus 20 near a shower head 14 installed in a typical shower enclosure communicating or annunciating an audio signal or verbal message to the ear 164 of an individual 162. In this operation, the speaker or electro-acoustic transducer 110 of the present invention could be informing an individual that a parameter has been met. For example, the speaker 110 could annunciate that "the set temperature of 102 degrees has been obtained", "the water above set temperature", "the flow rate too high", "the shower time has 2 minutes left" or "alarm state is present". The present invention speaker 110 can also annunciate non-descript messages or signals, such as increasing chimes or signals to indicate the shower or faucet water is increasing in temperature, or decreasing chimes signals to indicate that the shower or faucet water is turning off. It is also anticipated by the Applicant that the present invention can include a combination of defined verbal or audio messages and non-descript signals. These examples are only exemplary and it is anticipated by the Applicant that numerous other annunciated audio signals or verbal messages could be included in the present invention. While FIG. 6 details the process of annunciating a verbal signal or audio message 160 to an individual 162 is shown in an typical shower enclosure, this process can be also utilized in typical sink and faucet embodiments shown in FIGS. 8, 9, 10, 11 and 12.

In additional, the speaker 110 of the present invention could be utilized to reply to an audio or verbal command 163 for confirmation purposes, such as "Did you ask me to turn on the water?", "Did you ask me to the water turned off?", "Want to enter programming mode?", "Want to set to metric units?", "Want to restrict to 2.2 liters per minutes?", etc. The confirmation audio or verbal messages will function to minimize the occurrence of false positive commands whereby false commands might be generated from normal conservations or television/radio speakers that are in close proximity to or are heard by the microphone 112. Also, these examples are only exemplary and it is anticipated by the Applicant that numerous other annunciated audio or verbal messages could be included in the present invention.

Figure 7:
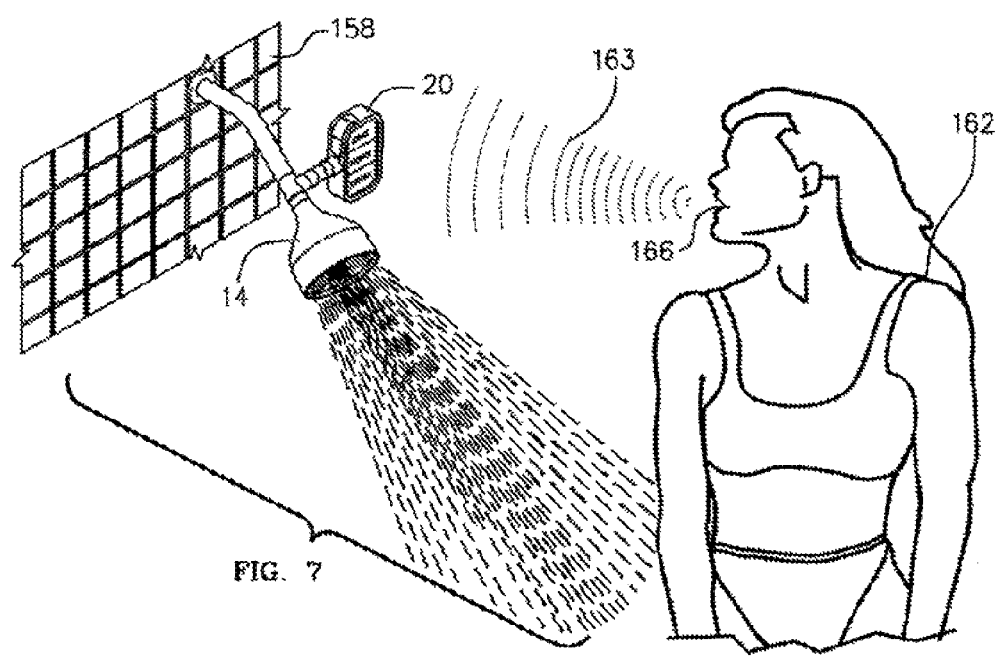
FIG. 7 is a perspective view showing an individual communicating an audio or verbal command with the display apparatus installed in a shower enclosure.

FIG. 7 is a perspective view showing an individual 162 using their mouth 166 to communicate an audio or verbal command 163 received by the microphone 112 of the display apparatus 20 installed in a typical shower enclosure.

The audio or voice commands or messages 163 that are received by the microphone 112 can be use in a toggle function, e.g. the first received audio or verbal command 163 can turn the water on and a second audio or verbal command 163 can turn the water off. The audio or verbal commands 163 can be the words "on" and "off", other programmed words or phrases that are recognized by the software programmed into the microprocessor or simply by a clap of the hands, whistle, snapping the fingers, or another non-descript audio means. It is also anticipated that the present invention can receive, through the microphone 112, other words, such as "brighter", "sequence parameters", "dimmer", "program mode", "faster", "slower", "show temperature", set temperature at 102 degrees", "change to metric" or other words that the software will recognize to perform certain tasks or operations associated with the descriptive word. The example commands are only exemplary as numerous other commands can be programmed for performing operations for the present invention. The present invention with verbal or audio command means 163 could have the audio or voice commands that correspond with programming instructions within the microprocessor or equivalent apparatus for turning on and off, increasing or decreasing the temperature, entering a programming mode, changing units, or other features can be incorporated into a faucet, shower or bath water supply system for controlling the water parameters. It is also anticipated that the audio and verbal command means 163 can be a stand-alone feature of the present invention without the need for a water parameter display. In operation, generally one turns on the water and adjusts the control dial/mechanism to the right temperature. Here, the present invention can respond to the audio or verbal command 163 to "turn on" the water supply and adjust to "95 degrees F." (in this temperature adjust example, the present invention would need to have the capacity to independently control both the hot and cold water lines, not shown). After the individual rinses off, they can either move to the side or turn off the water to begin applying soap and/or shampoo. The present invention can "turn off" the water supply by receiving an audio or verbal command 163. Once the individual has completed applying the soap and/or shampoo, the individual usually uses a "soapy" hand to turn on the control dial/mechanism. The present invention can "turn on" the water supply without touching the control dial/mechanism and getting it "soapy" by receiving an audio or verbal command or message. Once the individual has rinsed off and want to terminate the shower, the individual can use the present invention to "turn off" the water supply. The verbal or audio commands presented here are only exemplary, and many other various of verbal or audio commands can be utilized. Furthermore, in a simple example, the shower or sink/bath faucet can to toggled on and off with a non-descript verbal or audio signal, such as the clap of the hands.

Voice recognition software, now common in many computer programs and in many GPS systems, could be incorporated into the memory banks of the microprocessor for audio or verbal command or annunciation processes instructions. Such programs can be incorporated into the memory of the microprocessor or a n additional bank of memory. Examples of audio or verbal recognition software are Dragon Naturally Speaking and other verbal recognition products developed and marketed by the Nuance Communications Inc. This product allows more efficiency with your PC. For example, it is stated that the product can turn your voice into text three times faster than most people type with up to 99% accuracy. Dragon Naturally Speaking works with the most commonly used desk applications, including Microsoft Word, Internet Explorer, AOL and more.

MacSpeech Dictate is another verbal recognition product that recognizes and understands 13 English language variations, nine with U.S. spelling and four with U.K. spelling.

e-Speaking is a comprehensive voice and speech recognition program to use your voice for command & control of your computer and dictation. Reduce or eliminate mouse clicks or keyboard input. Open Web sites, documents, or programs using your voice. Perform navigation and editing functions, dictate letters, memos, and email messages.

Tazti—Free Speech Recognition Software by Voice Tech Group, Inc.—The Tazti application was designed to be a voice recognition search software and allows a user to make searches of many search engines by talking to his/her PC. Users can log into, navigate and search the Facebook and Myspace websites by speaking to their PC, Users can control the iTunes player (by Apple) if it's installed on their PC, change tracks, adjust volume, search or spell search Itunes music store and perform 30 other functions by speaking to their PC, Users can perform searches and spell searches of popular search engines . . . . Google, Yahoo, MSN, Wikipedia, ASK by speaking to their PC. Tell tazti which search engine to use, then when it signals you with a beep, tell it what to search for and it brings you the results of your search, Users can perform searches and spell searches for videos, photos, music and other items on AOL Video, Flicker, Amazon and Ebay by speaking to their PC.

Windows Speech Recognition—Windows Speech Recognition in Windows Vista empowers users to interact with their computers by voice. It was designed for people who want to significantly limit their use of the mouse and keyboard while maintaining or increasing their overall productivity. You can dictate documents and emails in mainstream applications, use voice commands to start and switch between applications, control the operating system, and even fill out forms on the Web.

CMU Sphinx is a popular open source speech recognition system. It is currently used by researchers and developers in many locations world-wide, including universities, research institutions and in industry. CMU Sphinx's liberal license terms has made it a significant member of the open source community and has provided a low-cost way for companies to build businesses around speech recognition.

VoxForge was set up to collect transcribed speech for use in Open Source Speech Recognition Engines ("SRE"s) such as such as ISIP, HTK, Julius and Sphinx.

The Hidden Markov Model Toolkit (HTK) is a portable toolkit for building and manipulating hidden Markov models. HTK is primarily used for speech recognition research although it has been used for numerous other applications including research into speech synthesis, character recognition and DNA sequencing. HTK is in use at hundreds of sites worldwide. HTK consists of a set of library modules and tools available in C source form. The tools provide sophisticated facilities for speech analysis, HMM training, testing and results analysis. The software supports HMMs using both continuous density mixture Gaussians and discrete distributions and can be used to build complex HMM systems. The HTK release contains extensive documentation and examples.

"Julius" is a high-performance, two-pass large vocabulary continuous speech recognition (LVCSR) decoder software for speech-related researchers and developers. Based on word N-gram and context-dependent HMM, it can perform almost real-time decoding on most current PCs in 60 k word dictation task. Major search techniques are fully incorporated such as tree lexicon, N-gram factoring, cross-word context dependency handling, enveloped beam search, Gaussian pruning, Gaussian selection, etc. Besides search efficiency, it is also modularized carefully to be independent from model structures, and various HMM types are supported such as shared-state triphones and tied-mixture models, with any number of mixtures, states, or phones. Standard formats are adopted to cope with other free modeling toolkit such as HTK, CMU-Cam SLM toolkit, etc.

IBM ViaVoice—With Embedded ViaVoice technology behind today's small mobile devices and automotive telematics systems, developers can easily provide users with voice access to information. Provides fully integrated, automatic speech-recognition and text-to-speech capabilities for small mobile devices, including automotive telematics systems and hands-free phones, Helps minimize the skills and time needed to develop advanced voice applications for devices and remote systems, Includes freeform command support for natural and intuitive command phrases that do not need to be known ahead of time or memorized for future use.

The Applicant anticipates that custom developed software using some of the previously described software code or completely custom designed code could be utilized with the present invention to process programmed instructions. The Applicant also anticipates that the audio or verbal annunciation could be in or for international languages (e.g. Spanish, German, Japanese), different voices, e.g. male or female, English or American or Australian dialects. And the audio or verbal control means could function to control the volume of the speaker or to control the sensitivity or performance features of the microphone.

The Applicant also anticipates that in some software instances, the teaching session or period for certain verbal, audio or speech recognition may be necessary to calibrate the present invention to certain situations.

It is also anticipated that the microphone 112 or programmed software might need to be tuned to reject, discern or attenuate certain frequencies, such as those generated by running water to be able to detect and comprehend the audio or verbal commands. Alternately, certain audio filters may be utilized to reject, discern or attenuate certain frequencies, such as those generated by running water, to be able to detect and comprehend the audio or verbal commands.

It is anticipated by the Applicant that over-ride mechanism (s), e.g. a water control valve, can be also used with the present invention in the situation where any audio or verbal commands are not properly received and the water parameter must be controlled.

FIG. 8 is a perspective view of a third embodiment showing the display apparatus 130 extending from a typical sink 120, having a drain 124, overflow drain 126, drain control knob 128, single valve hot or cold control valve 127, and sink faucet 122. The display apparatus is shown displaying water parameters and having a speaker 110 and microphone 112. The electrical circuitry and microprocessor can be located with the display apparatus 130 or can be positioned in a remote location e.g. under the sink, and electronically communicate with the display apparatus 130, microphone 112 or speaker 110 using wired or wireless technology.

It is also anticipated that standard sink and bath faucets, and current faucets which have motion or infra-red sensors for turning on an off the water supply could benefit from the audio or verbal detection means described herein. The disadvantage of the current faucets with motion or infra-red sensors technology is that the individual user has no control over that device. In some cases the lack of control by the user is desired, for example in public restrooms where water control is essential and misuse can result in wasted water usage. But in other situations, such as in private facilities or home, it would be beneficial. For example, it would be advantageous to instruct the faucet to turn on for a few seconds to wet the hands, the turn off as one applies soap, and then turn on again for rinsing the soap/debris from the hands, and then turning water off. Various conditions, e.g. dirty greasy hands vs. sanitization of one's hands, would require various timing situations.

FIG. 9 is a perspective view of a fourth embodiment showing the display apparatus 148 extending from a typical bath 140, with a hot 146 and cold 144 water control valve, and a bath faucet 142. The display apparatus is shown displaying water parameters and having a speaker 110 and microphone 112. The electrical circuitry and microprocessor can be located with the display apparatus 148 or can be positioned in a remote location e.g. under the sink, and electronically communicate with the display apparatus 130, microphone 112 or speaker 110 using wired or wireless technology.

FIG. 10 is an exploded view of the third, fourth, fifth and sixth embodiments of the display apparatus showing a speaker 110 and a microphone 112 incorporated within the display apparatus. The position and size of the speaker 110 and microphone 112 are relative and only exemplary, as the either or both the speaker 110 and microphone 112 can be located in other orientations and positions e.g. speaker on the back side of the display, and the relative size of the speaker 110 might be different. While standard speakers or electro-acoustic transducers technology is incorporated by reference into the present invention, it is preferable that that speakers or electro-acoustic transducers be water resistant or water proof. Usually to accomplish this feature, speakers or electro-acoustic transducers use a special coating or covering to achieve the waterproof condition. In addition, waterproof piezoelectric speakers might also be utilized in the present invention. Likewise, while standard microphone (electro-to-acoustic transducers) technology is incorporated by reference into the present invention, it is preferable that that microphone or electro-to-acoustic transducers be water resistant or water proof. Usually to accomplish this feature, microphones and electro-acoustic transducers use a special coating or covering to achieve the waterproof condition. In addition, waterproof piezoelectric microphones might also be utilized in the present invention.

Figure 11:
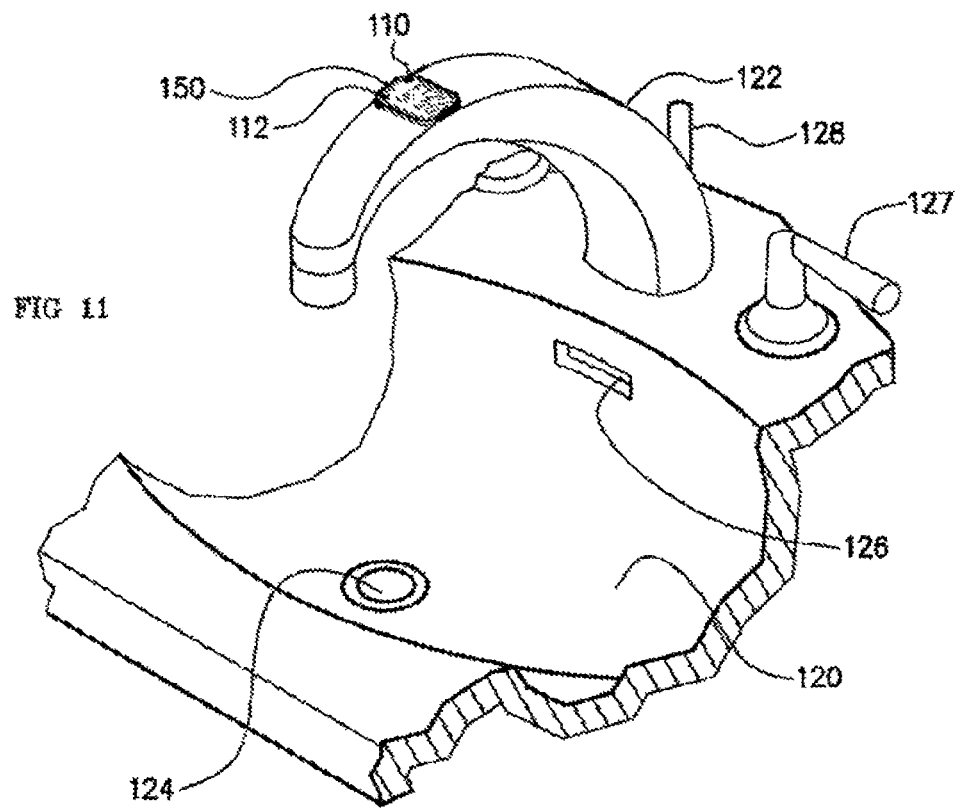
FIG. 11 is a perspective view showing a fifth embodiment the display means incorporated within a typical sink faucet.

FIG. 11 is a perspective view of a fifth embodiment showing the display apparatus 150 incorporated within a sink faucet 112 attached to a typical sink 120, having a drain 124, overflow drain 126, drain control knob 128, hot or cold control valve 127 (could be a single hot/cold control valve knob). The display apparatus is shown dispNying water parameters and having a speaker 110 and microphone 112. The electrical circuitry and microprocessor can be located with the display apparatus 130 or can be positioned in a remote location e.g. under the sink, and electronically communicate with the display apparatus 130, microphone 112 or speaker 110 using wired or wireless technology.

Figure 12:
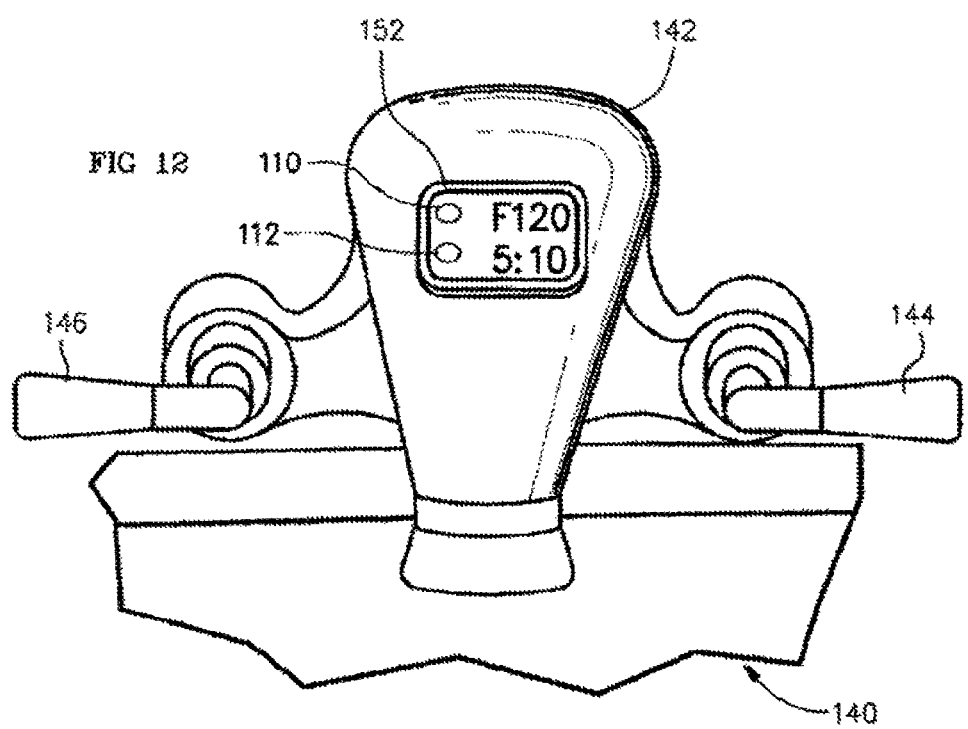
FIG. 12 is a perspective view showing a sixth embodiment the display means incorporated within a typical bath faucet.

FIG. 12 is a perspective view of a sixth embodiment showing the display apparatus 152 incorporated with a bath faucet 142 attached to a typical bath 140, with a hot 146 and cold 144 water control valve. The display apparatus displaying water parameters and is shown having a speaker 110 and microphone 112. The electrical circuitry and microprocessor can be located with the display apparatus 148 or can be positioned in a remote location e.g. under the sink, and electronically communicate with the display apparatus 130, microphone 112 or speaker 110 using wired or wireless technology.

While this invention has been described as having a preferred design, the present invention can be further modified within the spirit and scope of this disclosure. The application is therefore intended to cover any variations, uses, or adaptations of the invention using its general principles. Further, this application is intended to cover such departures from the present disclosure as come within known or customary practice and the art to which this invention pertains and which fall within the limits of the appended claims.

The invention claimed is:

1. A shower, a bath, sink, kitchen, or other faucet head or body assembly including a time-based water parameter display apparatus, said time-based water parameter display apparatus, comprising:

an electronic display apparatus either connected by a water pipe union, articulated joint mechanism, joint mechanism, or located remotely to a shower, sink, bath, kitchen or other faucet head or body assembly, said water pipe union, joint mechanism or articulated joint mechanism having a wired communication means, or said remotely located display means having a wired or wireless electronic communication means;

said electronic display including electrical circuitry, a microprocessor, and a power supply said electronic display optionally having activator or touch screen functionality;

a timing parameter, said timing parameter monitoring and exhibiting the cumulative time since the water flow has been initiated on said display;

a temperature sensor in communication with said electrical circuitry;

a flow sensor in electrical communication with said electrical circuitry;

said electronic display apparatus in electrical communication with said electrical circuitry, said electrical circuitry having a programmable microprocessor that is designed to simultaneously or sequentially show temperature, timing and water flow rate parameters on a said electronic display apparatus;

a verbal or audio communication means designed to communicate with said electrical circuitry and said microprocessor for processing certain operational instructions;

said microprocessor having programmed software instructions, and/or said electrical circuitry has audio filters, to reject, discern or attenuate certain frequencies that interfere with said audio or verbal commands, and;

wherein said time-based water parameter display apparatus includes an over-ride mechanism in the situation where any audio or verbal commands are not properly received or misinterpreted, said over-ride mechanism comprising an electronic button or switch located on said kitchen, shower, sink, bath or other faucet head or body assembly that electrically communicates with said electrical circuitry.

2. A shower, bath, sink, kitchen or other faucet head or body assembly including a time-based water parameter display apparatus of claim 1, wherein said verbal or audio communication means comprises an detection means that includes a microphone or electro-to-acoustic transducer designed to receive an audio signal or verbal instruction.

3. A shower, bath, sink, kitchen or other faucet head or body assembly including a time-based water parameter display apparatus of claim 2, wherein said audio signal or verbal instruction "on" turns on the supply water.

4. A shower, bath, sink, kitchen or other faucet head or body assembly including a time-based water parameter display apparatus of claim 2, wherein said audio signal or verbal instruction "off" turns off the supply water.

5. A shower, bath, sink, kitchen or other faucet head or body assembly including a time-based water parameter display apparatus of claim 2, wherein any audio signal or verbal instruction toggles the supply water on and off.

6. A shower, bath, sink, kitchen or other faucet head or body assembly including a time-based water parameter display apparatus of claim 2, wherein the microprocessor has software that recognizes various audio or verbal commands that uses descriptive words and phrases and has software instructions associated with the descriptive words and/or phrases that performs specific activities or operations.

7. A shower, bath, sink, kitchen or other faucet head or body assembly including a time-based water parameter display apparatus of claim 1, wherein, the microprocessor can be programmed to respond to custom audio signals or verbal.

8. A shower, bath, sink, kitchen or other faucet head or body assembly including a time-based water parameter display apparatus of claim 1, wherein the verbal or audio communication means comprises a speaker or electro-acoustic transducers for annunciating or communicating a confirmatory verbal message or audio signal.

9. A shower, bath, sink, kitchen or other faucet head or body assembly including a time-based water parameter display apparatus of claim 1, wherein said electrical circuitry and microprocessor are remotely positioned and communicate with said display apparatus by wired or wireless means.

10. A shower, sink, bath, kitchen or other faucet head or body assembly incorporating a time-based water parameter display assembly, said shower, said faucet head or body incorporating a time-based water parameter apparatus comprising:

a shower, bath, sink, kitchen or other faucet head or body assembly;

an electronic display apparatus incorporated within or attached to said faucet head or body, said display means having the capability to visually display one or more water parameters from a display;

electrical circuitry with a power source;

a microprocessor, said microprocessor in electrical communication with said electrical circuitry;

a timing parameter, said timing parameter monitoring and exhibiting the cumulative time since the water flow has been initiated on said display;

a temperature sensor in electrical communication with said electrical circuitry;

a flow sensor in electrical communication with said electrical circuitry;

said electronic display apparatus in electrical communication with said electrical circuitry, said electrical circuitry having a programmable microprocessor that is designed to simultaneously or sequentially exhibit temperature, timing and water flow rate parameters on a said electronic display apparatus;

a verbal or audio communication means designed to communicate with said electrical circuitry and said microprocessor for processing certain operational instructions;

said microprocessor having programmed software instructions, and/or said electrical circuitry has audio filters, to reject, discern or attenuate certain frequencies that interfere with said audio or verbal commands; and wherein said time-based water parameter display apparatus includes an over-ride mechanism in the situation where any audio or verbal commands are not properly received or misinterpreted, said over-ride mechanism comprising an electronic button or switch located on said kitchen, shower, sink, bath or other faucet head or body assembly that electrically communicates with said electrical circuitry.

11. A shower, sink, a bath, kitchen or other faucet head or body assembly incorporating a time-based water parameter display apparatus of claim 10, wherein said verbal or audio communication means comprises an detection means that includes a microphone or electro-to-acoustic transducer designed to receive an audio signal or verbal instruction.

12. A shower, sink, a bath, kitchen or other faucet head or body assembly incorporating a time-based water parameter display apparatus of claim 11, wherein said audio signal or verbal instruction "on" turns on the supply water.

13. A shower, sink, a bath, kitchen or other faucet head or body assembly time-based water parameter display apparatus of claim 11, wherein said audio signal or verbal instruction "off" turns off the supply water.

14. A shower, sink, a bath, kitchen or other faucet head or body assembly time-based water parameter display apparatus of claim 11, wherein any audio signal or verbal instruction toggles the supply water on and off.

15. A shower, sink, a bath, kitchen or other faucet head or body assembly time-based water parameter display apparatus of claim 11, wherein the microprocessor has software that recognizes various audio or verbal commands that use descriptive words and phrases and has software instructions associated with the descriptive words and/or phrases that can perform specific activities or operations.

16. A shower, sink, bath, kitchen or other faucet head or body assembly time-based water parameter display apparatus of claim 10, wherein the microprocessor can be programmed to learn custom audio signals or verbal instructions.

17. A kitchen, shower, sink, a bath or other faucet head or body assembly incorporating time-based water parameter display apparatus of claim 10, wherein the microprocessor can be programmed to respond to custom audio signals or verbal instructions.

18. A kitchen, shower, sink, a bath or other faucet head or body assembly incorporating time-based water parameter display apparatus of claim 10, wherein the verbal or audio communication means comprises a speaker or electro-acoustic transducers for annunciating or communicating a confirmatory verbal message or audio signal.

19. A kitchen, shower, sink, a bath or other faucet head or body assembly incorporating time-based water parameter display apparatus of claim 10, wherein said electrical circuitry and microprocessor are remotely positioned and communicate with said display apparatus by a wired or wireless means.

20. A time-based water control/annunciating apparatus for attaching to the water supply line comprising:
- electrical circuitry with a power source;
- a microprocessor, said microprocessor in electrical communication with said electrical circuitry;
- a timing parameter, said timing parameter monitoring the cumulative time since the water flew has been initiated;
- a temperature sensor in electrical communication with said electrical circuitry;
- a flow sensor in electrical communication with said electrical circuitry;
- an electronic display apparatus in electrical communication with said electrical circuitry, said electrical circuitry having a programmable microprocessor that is designed to simultaneously or sequentially show temperature, timing and flow parameters on said electronic display apparatus;
- a verbal or audio communication means designed to communicate with said electrical circuitry and said microprocessor for processing certain operational instructions;
- said microprocessor having programmed software instructions, and/or said electrical circuitry has audio filters, to reject, discern or attenuate certain frequencies that interfere with said audio or verbal commands; and
- wherein said time-based water parameter display apparatus includes an over-ride mechanism in the situation where any audio or verbal commands are not properly received or misinterpreted, said over-ride mechanism comprising an electronic button or switch that electrically communicates with said electrical circuitry.

21. The time-based water control/annunciating apparatus of claim 20, wherein said verbal or audio communication means comprises an detection means that includes a microphone or electro-to-acoustic transducer designed to receive an audio sign or verbal instruction.

22. The time-based water control/annunciating apparatus of claim 21, wherein said audio signal or verbal instruction "on" turns on the supply water.

23. The time-based water control/annunciating apparatus of claim 21, wherein said audio signal or verbal instruction "off" turns off the supply water.

24. The time-based water control/annunciating apparatus of claim 21, wherein any audio signal or verbal instruction initiates instructions to toggle the supply water on and off.

25. The time-based water control/annunciating apparatus of claim 21, wherein the microprocessor has software that recognizes various audio or verbal commands that use descriptive words and phrases and has software instructions associated with the descriptive words and/or phrases that can perform specific activities.

26. The time-based water control/annunciating apparatus of claim 20, Wherein the microprocessor can be programmed to learn various audio signals or verbal instructions.

27. The time-based water control/annunciating apparatus of claim 20, wherein the microprocessor can be programmed to respond to custom audio or verbal instructions or signals.

28. The time-based water control/annunciating apparatus of claim 20, wherein the verbal or audio communication means comprises a speaker or electro-acoustic transducers for annunciating or communicating a confirmatory verbal message or audio signal.

\* \* \* \* \*